US008477937B2

(12) United States Patent
Akhavan-Toyserkani et al.

(10) Patent No.: US 8,477,937 B2

(45) Date of Patent: Jul. 2, 2013

(54) METHODS AND SYSTEMS FOR PROVIDING INTERFERENCE BASED PHYSICAL-LAYER ENCRYPTION

(75) Inventors: Kasra Akhavan-Toyserkani, North Bethesda, MD (US); Andrew Ripple, Lovettsville, VA (US); Michael Beeler, Jefferson, MD (US); Cris Mamaril, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 180 days.

(21) Appl. No.: 13/149,641

(22) Filed: May 31, 2011

(65) Prior Publication Data

US 2011/0228929 A1 Sep. 22, 2011

Related U.S. Application Data

(60) Provisional application No. 61/473,114, filed on Apr. 7, 2011.

(51) Int. Cl.

*H04L 7/027* (2006.01)
*H04K 1/02* (2006.01)
*H04B 1/69* (2006.01)

(52) U.S. Cl.

USPC ........... 380/206; 380/204; 380/207; 380/221; 380/270; 370/241; 375/144; 375/145; 375/148; 375/346

(58) Field of Classification Search

USPC ............ 380/38, 204, 206, 221, 270; 370/342; 375/144, 145, 148, 346

See application file for complete search history.

(56) References Cited

U.S. PATENT DOCUMENTS 5,099,493 A * 3/1992 Zeger et al. .................. 370/342
5,748,677 A * 5/1998 Kumar .......................... 375/285
5,825,807 A * 10/1998 Kumar .......................... 375/130
5,978,413 A * 11/1999 Bender ......................... 375/149
6,349,138 B1 * 2/2002 Doshi et al. .................. 380/200
2003/0095662 A1 * 5/2003 Jarosinski et al. ............ 380/268
2005/0055546 A1 * 3/2005 Dzung .......................... 713/151
2008/0198832 A1 8/2008 Chester
2009/0110197 A1 4/2009 Michaels
2009/0196420 A1 8/2009 Chester et al.
2009/0279592 A1 11/2009 Pratt et al.

OTHER PUBLICATIONS

Chorti, Arsenia. "Masked-OFDM: A Physical Layer Encryption for Future OFDM Applications", 2010.*

Jorgensen, Morten Lisborg et al. "Shout to Secure: Physical—Layer Wireless Security with Known Interference", 2007.*

Alan J. Michaels et al. "Efficient and Flexible Chaotic Communication Waveform Family" The 2010 Military Communications Conference, 2010 pp. 354-356; and figure 2.

* cited by examiner

*Primary Examiner* — Michael Simitoski

(74) *Attorney, Agent, or Firm* — Booth Udall Fuller, PLC

(57) ABSTRACT

A method for encrypting an information carrier comprising generating a sequence of data using a sequence generator, modulating, using a first modulator an output from the sequence generator such that an interference signal results, encoding the interference generator's synchronization information using an encoder, modulating, using a second modulator, the encoded synchronization information such that a synchronization carrier signal results, spreading the synchronization carrier signal using a spreader such that a spread sub-carrier synchronization signal results, and combining the modulated information carrier signal, interference signal, and spread sub-carrier synchronization signal using a signal combiner such that a composite signal results, the interference signal having one or more signal characteristics that results in obfuscation of the information carrier signal when the information carrier signal and interference signal are combined.

42 Claims, 7 Drawing Sheets

METHODS AND SYSTEMS FOR PROVIDING INTERFERENCE BASED PHYSICAL-LAYER ENCRYPTION

CROSS REFERENCE TO RELATED APPLICATIONS

This document claims the benefit of the filing date of U.S. Provisional Patent Application No. 61/473,114, entitled "Methods and Systems for Providing Interference Based Physical-Layer Encryption" to Kasra Akhavan-Toyserkani, et al., which was filed on Apr. 7, 2011, the disclosure of which is hereby incorporated entirely by reference herein.

BACKGROUND

1. Technical Field

Aspects of this document relate generally to telecommunication systems and techniques for transmitting data across a telecommunication channel.

2. Background Art

The need to provide a secure transmission channel continues to be an ongoing challenge in the communications industry. Many methods exist in the existing art, and may be brought to bear to provide both physical and data security. However, these existing methods are waveform dependent and thus, a need exists for a waveform agnostic approach to securing a transmission channel for any broadcast medium whether the transmission scheme is point-to-point, point-to-multipoint or multipoint-to-multipoint.

SUMMARY

Implementations of a method for encrypting an information carrier signal may comprise generating a sequence of data using a sequence generator, modulating, using a first modulator an output from the sequence generator such that an interference signal results, encoding the interference generator's synchronization information using an encoder, modulating, using a second modulator, the encoded synchronization information such that a synchronization carrier signal results, spreading the synchronization carrier signal using a spreader such that a spread sub-carrier synchronization signal results, and combining a modulated information carrier signal, the interference signal, and the spread sub-carrier synchronization signal using a signal combiner such that a composite signal results, the interference signal having one or more signal characteristics that results in obfuscation of the information carrier signal when the information carrier signal and interference signal are combined.

Particular implementations may comprise one or more of the following features. The method may further comprise generating the interference signal using an interference generator that modulates the output of the sequence generator. The method may further comprise authenticating the information carried in the spread sub-carrier synchronization signal using an authentication device. The method may further comprise encrypting information carried in the spread sub-carrier synchronization signal using an encryption device. The method may further comprise providing forward error correction (FEC) to the spread sub-carrier synchronization signal using the encoder. The sub-carrier synchronization signal may be modulated using one or more modulating devices. The spreading may further comprise using spread spectrum techniques to reduce a power spectral density of the spread sub-carrier synchronization signal. The method may further comprise determining a center frequency and occupied bandwidth of the information carrier signal using one or more Fourier transform techniques. The method may further comprise determining the power level of the information carrier signal using a power detector. The method may further comprise manually configuring one or more characteristics of the information carrier signal to specify a center frequency, occupied bandwidth, or power level of the information carrier signal. The method may further comprise up-converting the interference and sub-carrier synchronization signals prior to combining these signals with the information carrier signal. The combining of the signals may occur at baseband frequency.

Implementations of a method of recovering encrypted information may comprise receiving a composite carrier signal using a receiving device, the composite carrier signal comprising a previously combined information carrier signal, interference signal, and spread sub-carrier synchronization signal, wherein the interference signal has one or more signal characteristics that results in obfuscation of the information carrier signal by the interference signal in the composite signal, despreading the spread sub-carrier synchronization signal using a despreader, demodulating the despread sub-carrier synchronization signal using a demodulator, decoding the demodulated despread sub-carrier synchronization signal using a decoder, resulting in extracted synchronization information from the sub-carrier synchronization signal, synchronizing an interference generator using the extracted synchronization information such that the interference generator creates a replica of the interference signal contained in the received composite signal, and cancelling the interference signal from the composite signal using a cancelling device that uses one or more cancellation techniques to obtain the information carrier signal.

Particular implementations may comprise one or more of the following features. The method may further comprise splitting the composite carrier signal using a signal splitter. The dispreading may further comprise spread spectrum despreading. The method may further comprise decrypting information carried in the sub-carrier synchronization signal using a decryption device. The method may further comprise authenticating information carried in the sub-carrier synchronization signal using an authentication device. The method may further comprise applying a frame parser to information carried in the sub-carrier synchronization signal. The method may further comprise generating a synchronized interference sequence using an interference sequence generator. The method may further comprise modulating the interference sequence using a modulator to generate a replica of the interference signal. The method may further comprise providing phase alignment between the replicated interference signal and the interference signal in the composite carrier signal using a memory device. The method may further comprise configuring a center frequency, occupied bandwidth, or power level of the interference carrier signal, information carrier signal, or composite carrier signal.

Implementations of a system for encrypting an information carrier may comprise a sequence generator configured to generate a sequence of data, a first modulator configured to modulate an output from the sequence generator such that an interference signal results, an encoder configured to encode the interference generator's synchronization information, a second modulator configured to modulate the encoded synchronization information such that a synchronization carrier signal results, a spreader configured to spread the synchronization carrier signal such that a spread sub-carrier synchronization signal results, and a combiner configured to combine a modulated information carrier signal, the interference signal, and the spread sub-carrier synchronization signal using a signal combiner such that a composite signal results, the interference signal having one or more signal characteristics that results in obfuscation of the information carrier signal when the information carrier signal and interference signal are combined.

Particular implementations may comprise one or more of the following features. The system may further comprise an interference generator configured to generate the interference signal and modulate the output of the sequence generator. The system may further comprise an authentication device configured to authenticate the information carried in the spread sub-carrier synchronization signal. The system may further comprise an encryption device configured to encrypt information carried in the spread sub-carrier synchronization signal. The encoder may be further configured to provide forward error correction (FEC) to the spread sub-carrier synchronization signal. The system may further comprise one or more modulating devices configured to modulate the sub-carrier synchronization signal. The spreader may be further configured to use spread spectrum techniques to reduce a power spectral density of the spread sub-carrier synchronization signal. The system may further comprise a processor configured to determine a center frequency and occupied bandwidth of the information carrier signal using one or more Fourier transform techniques. The system may further comprise a power detector configured to determine the power level of the information carrier signal. The system may be further configured for manual configuration of one or more characteristics of the information carrier signal to specify a center frequency, occupied bandwidth, or power level of the information carrier signal. The system may further comprise an upconversion device configured to up-convert the interference and sub-carrier synchronization signals prior to combining these signals with the information carrier signal. The combiner may be further configured to combine the signals at baseband frequency.

Implementations of a system of recovering encrypted information may comprise a receiving device configured to receive a composite carrier signal, the composite carrier signal comprising a previously combined information carrier signal, interference signal, and spread sub-carrier synchronization signal, wherein the interference signal has one or more signal characteristics that results in obfuscation of the information carrier signal by the interference signal in the composite signal, a despreader configured to despread the spread sub-carrier synchronization signal, a demodulator configured to demodulate the despread sub-carrier synchronization signal, a decoder configured to decode the demodulated despread sub-carrier synchronization signal, resulting in extracted synchronization information from the sub-carrier synchronization signal, an interference generator configured to be synchronized using the extracted synchronization information and create a replica of the interference signal contained in the received composite signal, and a canceling device configured to cancel the interference signal from the composite signal using one or more cancellation techniques to obtain the information carrier signal.

Particular implementations may comprise one or more of the following features. The system may further comprise a splitter configured to split the composite carrier signal. The despreader may be further configured to use spread spectrum despreading. The system may further comprise a decryption device configured to decrypt information carried in the sub-carrier synchronization signal. The system may further comprise an authentication device configured to authenticate information carried in the sub-carrier synchronization signal.

The system may further comprise a frame parser configured to frame parse information carried in the sub-carrier synchronization signal. The system may further comprise an interference sequence generator configured to generate a synchronized interference sequence. The system may further comprise a modulator configured to modulate the interference sequence to generate a replica of the interference signal. The system may further comprise a memory device configured to provide phase alignment between the replicated interference signal and the interference signal in the composite carrier. The system may further comprise a configuration device that allows configuration of a center frequency, occupied bandwidth, or power level of the interference carrier signal, information carrier signal, or composite carrier signal.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1A:
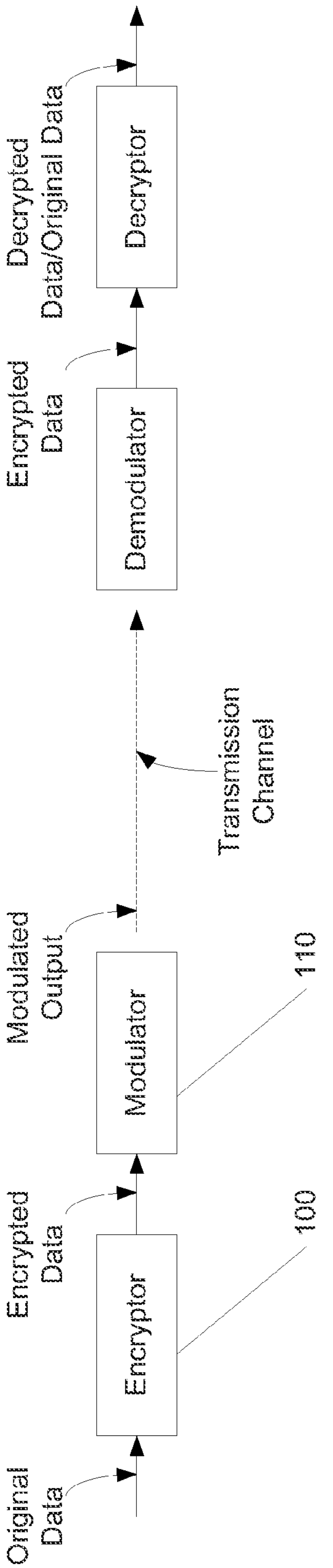
FIG. 1A PRIOR ART
FIGS. 1A-1B show implementations of prior art systems for providing encryption for communications systems.

This disclosure, its aspects and implementations, are not limited to the specific components, encryption types, or methods disclosed herein. Many additional components and assembly procedures known in the art consistent with methods and systems for providing interference based physical-layer encryption are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to methods and systems for providing interference based physical-layer encryption with a Low Probability of Detection (LPD) signaling channel for communications links. The described methods and systems provide a novel approach for providing a secure transmission path for a communication system while remaining agnostic to the type of data transmitted, forward error correction (FEC), or modulation type of the original signal. Particular implementations of the described methods and systems apply to wireless satellite communications, but the methods described are not limited to satellite communications and it will be clear to those of ordinary skill in the art from this disclosure, the principles and aspects disclosed herein may readily be applied to any electromagnetic (IF, RF, optical and the like) communications system, such as cellular phone, wireless networking devices, or terrestrial broadcast network without undue experimentation.

In some implementations, the interference based physical-layer encryption methods add interference to the desired waveform before transmission and use cancellation technology to cancel the interference at the receiving end.

Another novelty described in this disclosure provides a Low-Probability of Detection (LPD) channel for transmitting the cryptographic signaling information required for synchronizing the interference encryption and decryption (cancellation) devices at the respective ends.

The described methods and systems may operate independent of a feedback channel and may operate in both one-way and two-way transmission environments.

The methods and systems described provide the ability for someone skilled in the art, such as a communications software or test engineer, network operator, equipment manufacturer and the like, to utilize the described methods and systems.

The methods and systems described in this disclosure may employ digital signal processing (DSP) techniques such as, but not limited to, encapsulation, encryption/decryption, framing and packetization techniques which can easily be implemented in Field-Programmable Gate Array (FPGA), Programmable Logic Device (PLD), Programmable Integrated Circuit (PIC), Digital Signal Processor (DSP), Application Specific Integrated Circuit (ASIC) or general purpose microprocessors using conventional implementation methods known in the art with knowledge of this disclosure.

Many methods have been developed to obscure, encrypt, obfuscate, etc. data in a manner to prevent someone who is unauthorized from receiving content in a format that would be usable or exposing the user information in a format that would be useable in any manner.

Figure 1B:
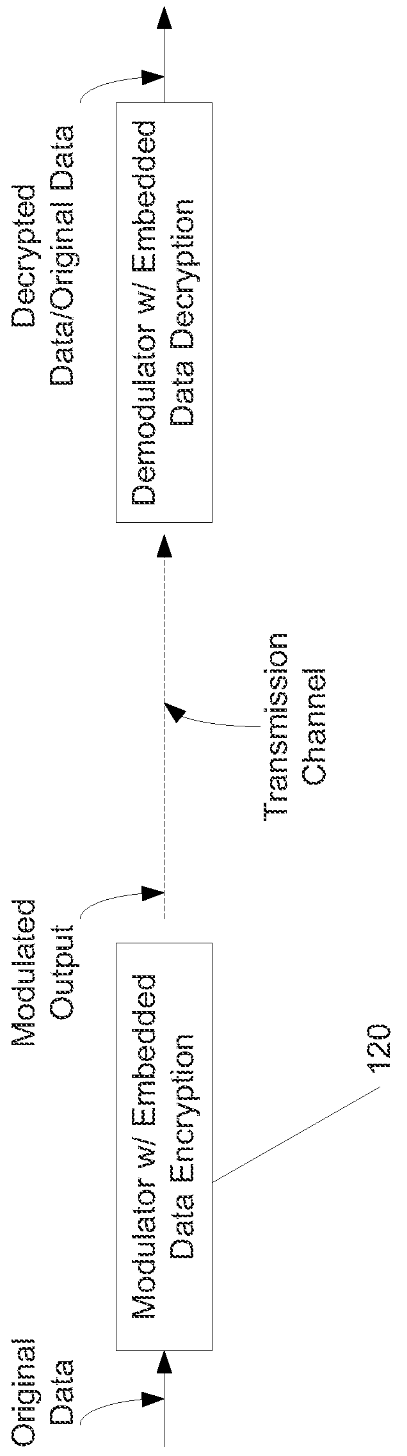
FIG. 1B PRIOR ART

This disclosure relates to methods and systems for providing interference based physical-layer encryption for a communications channel. In the existing art, encryption may be provided through the use of an encryptor 100 prior to modulating the data by a modulating device 110, or encryption is provided by a modulating device having embedded data encryption 120 prior to modulating the data as shown in FIGS. 1A and 1B. The systems shown in FIGS. 1A and 1B support encryption of content at the source or inline at any point along the transmission path.

Figure 2:
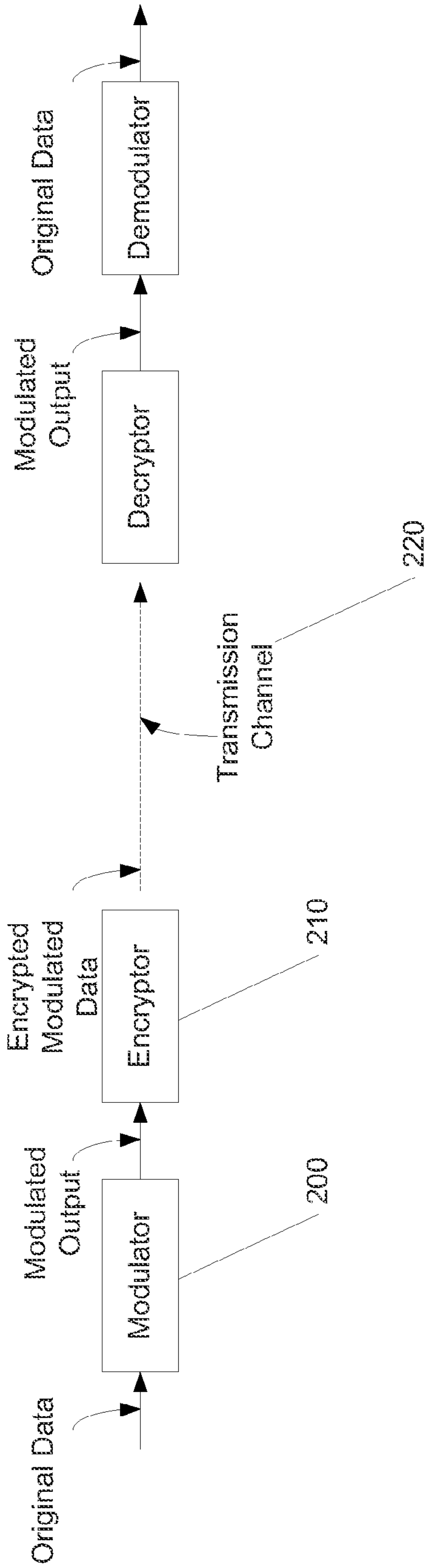
FIG. 2 shows an implementation of a system using an interference based physical layer encryption.

In some implementations of the systems and methods disclosed herein, encryption 210 is applied to the physical waveform post modulation and outside the modulating device 200. Additionally, in some implementations, the encryption may be performed within the modulating device at baseband I (in-phase) and Q (quadrature-phase) before up-conversion to an intermediate or radio frequency and before introduction to the transmission channel 220 as shown in FIG. 2.

Using particular implementations of the described methods and systems provides a completely waveform-agnostic approach to the encryption of the data in a manner that uses interference techniques, which are typically undesirable, to be a benefit for obscuring the content of the information contained within the modulated signal.

Particular implementations of the described methods and systems have novelty, among other reasons, at least in the fact that they eliminate boundaries in the encryption of the waveform between where frames start, stop or transition from one state to another. In short, the entire signal including headers, payload and footers is encrypted, which results in a completely encrypted signal. Also, by obfuscating the entire signal, a standard receiver will not be able to acquire and demodulate the signal. This may provide a stronger level of encryption than exists in the current art.

Figure 3:
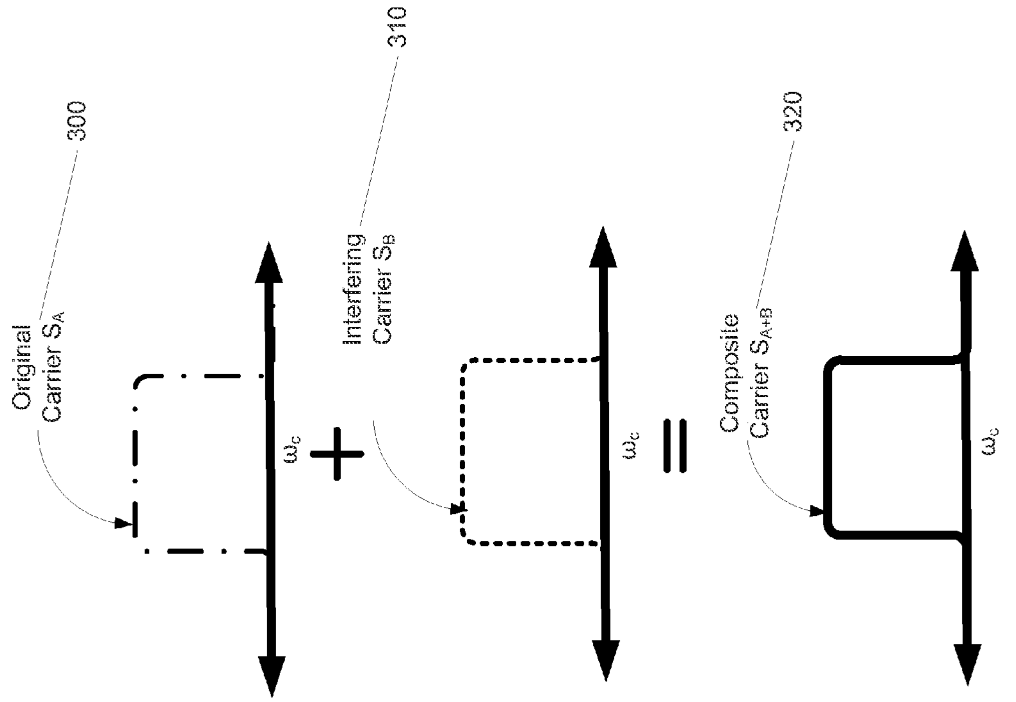
FIG. 3 shows a desired signal and interfering signal being combined into a composite signal.

In some implementations, the desired waveform containing the original signal is designated as $S_A$ 300 and is traditionally modulated and sent over the transmission channel without modification. FIG. 3 shows how an interfering signal $S_B$ 310, with similar properties (power level, occupied bandwidth and center frequency), may be combined with the original signal, $S_A$ 300, to create a composite 320 of two signals.

Figure 4:
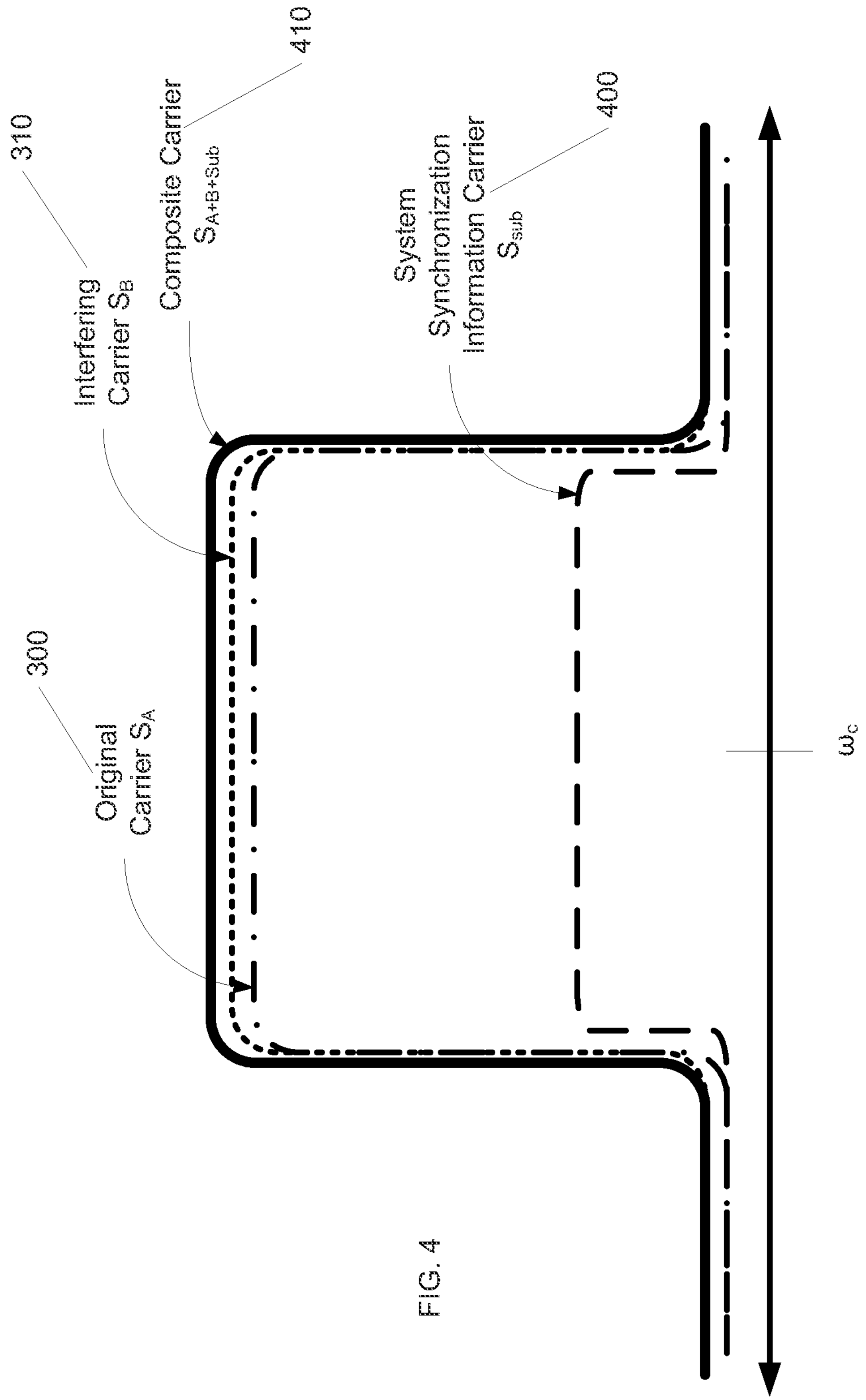
FIG. 4 shows a composite signal combined with a system synchronizing information sub-channel.

FIG. 4 shows how the combined signals, $S_A$ 300 and $S_B$ 310, result in a composite signal, $S_{A+B}$ 320, and prevent either signal from being recovered. Decoding is prevented since both signals directly interfere with one another, resulting in equal noise power to both signals, e.g. the power ratio between $S_A$ 300 and $S_B$ 310 is approximately 0 dB. Additionally, a System Synchronization Information (SSI) carrier signal (sub-carrier signal) 400 may be modulated and spread using a Direct Sequence Spread Spectrum (DSSS) technique to reduce the Power Spectral Density (PSD) and further combined with $S_{A+B}$ 320 to produce a complete composite encrypted carrier signal 410 with an embedded LPD SSI sub-carrier signal, which is denoted as $S_{A+B+Sub}$ 410 and shown in FIG. 4. The resulting methods and systems may provide an end-to-end encrypted path with a provision to provide forward link signaling via an LPD signaling channel.

Upon combining the original signal, $S_A$ 300, with the interfering signal, $S_B$ 310, a 3 decibel (3 dB) power penalty is assumed because both $S_A$ 300 and $S_B$ 310 have nearly identical power spectral densities and center frequencies. The concept of stacking signals using the same occupied bandwidth is outlined in U.S. Pat. No. 6,859,641 to Collins, et. al. (hereinafter "Collins"), the disclosure of which is herein incorporated by reference. Particular implementations of the present disclosure differ from Collins, however, in that instead of the signals being transmitted and received over the same spectrum (in opposite or transmit and receive directions) for cancellation, the signals are created at the same point of origin and transmitted as co-channel signals from the same transmit device, e.g. combined and transmitted on the same spectrum where $S_A$ is the original signal 300, and $S_B$ is the interfering signal 310.

The original signal $S_A$ 300 may be any signal and may be represented as $s_A(t)=A_I\cos(\omega_{c1}t)+A_Q\sin(\omega_{c1}t)$, and, to optimally interfere with $S_A$, $S_B$ may be represented as $s_B(t)=B_1\cos(\omega_{c2}t)+B_Q\sin(\omega_{c2}t)$. Noting that:

$A_I$ should be nearly equal to $B_I$ $A_Q$ should be nearly equal to $B_Q$ $\omega_{c1}$ and $\omega_{c2}$ should be equal or nearly equal for both $s_A(t)$ and $s_B(t)$, e.g. $\omega_{c1}$ and $\omega_{c2}$ may be $\omega_{c1}=\omega_{c2}$, $\omega_{c1}<\omega_{c2}$, or $\omega_{c1}>\omega_{c2}$ When combining the plurality of signals to create $S_{A+B+Sub}$ 410, the power that is taken from $S_{A+B}$ 320 due to combining $S_{Sub}$ 400 to create the composite signal $S_{A+B+Sub}$ 410 may be further considered. The described methods and systems may use up to 99% of the available bandwidth (3 dB bandwidth) for embedding the $S_{Sub}$ sub-carrier signal. The power taken away from $S_{A+B}$ 320 may be determined by the level of spreading of the $S_{Sub}$ carrier signal 400 and how far below the composite waveform $S_{A+B}$ 320 the $S_{Sub}$ sub-carrier signal 400 is placed.

$S_{Sub}$ 400 may be represented as $s_{Sub}(t)=C_{SubI}\cos(\omega_c t+\phi_c)+C_{SubQ}\sin(\omega w_c t+\phi_c)$. It is noteworthy that $\omega_c$ for $s_{Sub}(t)$ may not have to be equal or nearly equal for $s_A(t)$ and $s_B(t)$, as is required for the interfering signal configuration.

As an example, if $S_A$ 300 is assumed to have a relative power of 0 dB and $S_B$ 310 is placed at the same power, the resulting composite signal would have a resulting power increase of 3.01 dB. Therefore, $S_A$ 300 and $S_B$ 310 would appear to be −3.01 dB relative to one another. With the addition of the $S_{Sub}$ sub-carrier signal 400, the additional power is required to transmit, $S_B$ 310 and $S_{Sub}$ 400 is as follows:

If the original carrier signal's $S_A$ 300 relative power is 0 dB, the additional power required after combining the signals may be calculated as such if $S_{Sub}$ is 22 dB below $S_A$ (or $S_B$):

$S_A=0.0$ dB $S_B=S_A=0$ dB $S_{Sub}=S_A-22.00\text{ dB}=-22.00$ dB

Figure 5:
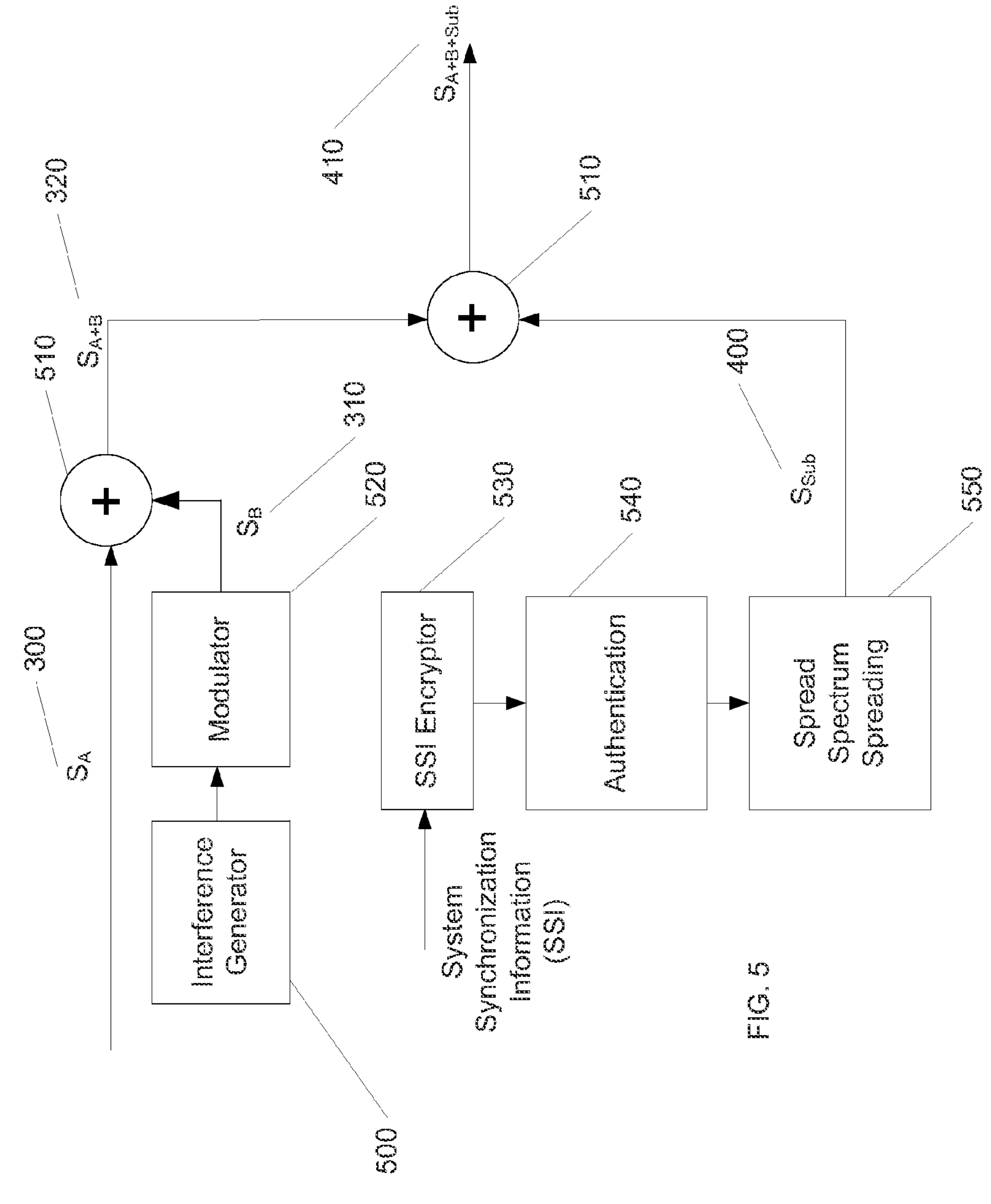
FIG. 5 shows an implementation of an encryption process in which an original information carrier signal, an interference carrier signal and a sub-carrier synchronization signal are processed to produce a composite signal.

Additional power required to transmit $S_{Sub}$ and $S_B=10*\text{Log}(10^{(0/10)}+10^{(0/10)}+10^{(-22/10)})=3.024$ dB FIG. 5 shows how a signal $S_B$ may be created using an interference generator 500 or pseudo-random source to produce an apparent random interfering signal. The signal of interest, $S_A$ 300, is combined with the interfering signal $S_B$ 310, which results in a composite carrier signal 320 that is completely encrypted. In addition to the creation of the composite signal, $S_{A+B}$ 320, the SSI sub-carrier signal 400 denoted as $S_{sub}$ is created and combined into the composite signal, $S_{A+B}$ 320, to form a composite encrypted signal and embedded LPD forward-link control channel denoted as $S_{A+B+Sub}$ 410. The resulting composite output $S_{A+B+Sub}$ 410 of the encryptor and the approximately relative power levels is shown in FIG. 4.

As shown in FIG. 5, the original signal $S_A$ 300 may be received by the encryption logic. First, the input is applied to a power combiner 510 where $S_A$ 300 is combined with interfering signal $S_B$ 310. The interference generator 500 or pseudo-random sequence may be input into a modulator 520 to produce an interfering signal $S_B$ 310. The creation of the interfering signal $S_B$ 310 may be performed using various methods and systems such as, but not limited to, a stream cipher or block cipher that provides a source to produce a nearly random interfering signal that results in a composite signal that is completely encrypted. The interfering signal generator method produces identical pseudorandom signals and be synchronized on both the encryptor and decryptor. The SSI channel sub-carrier signal ($S_{Sub}$) 400 provides a mechanism for synchronizing the interference generator in the encryptor and decryptor.

The resulting interference generator or pseudo-random sequence may then be modulated by any modulating technique such as, but not limited to, Binary-Phase Shift Keying (BPSK), Quadrature-Phase Shift Keying (QPSK), etc. to produce $S_B(t)=B_I\cos(\omega_{c2}t)+B_Q\sin(\omega_{c2}t)$. $S_B$ is then combined with $S_A$ represented as $S_A(t)=A_I\cos(\omega_{c1}t)+A_Q\sin(\omega_{c1}t)$, and the resulting composite output is $S_{A+B}$ represented as $S_A(t)+S_B(t)=A_I\cos(\omega_{c1}t)+A_Q\sin(\omega_{c1}t)+B_I\cos(\omega_{c2}t)+B_Q\sin(\omega_{c2}t)$; where $\omega_{c1}$ and $\omega_{c2}$ should be nearly equal for both $s_A(t)$ and $s_B(t)$, e.g. $\omega_{c1}$ and $\omega_{c2}$ may be $\omega_{c1}=\omega_{c2}$, $\omega_{c1}<\omega_{c2}$, or $\omega_{c1}>\omega_{c2}$.

The interfering signal generator's phase/sequence state and any other essential information may then be fed to the SSI encryptor 530 as a system synchronization information message. The SSI encryptor 530 may be, but is not limited to, a stream cipher, block cipher or any other method or system that may be used in the art. The next stage is the authentication module 540, where the SSI message is authenticated before transmission. In some implementations, the resulting encrypted and authenticated SSI message may then be modulated by any Binary-Phase Shift Keying (BPSK) or any modulating technique known in the art, spread using a spread spectrum technique 550 and then combined with $S_{A+B}$ 320. $S_{Sub}$ 400 is represented as $s_{Sub}(t)=C_{SubI}\cos(\omega_c t+\phi_c)+C_{SubQ}\sin(\omega_c t+\phi_c)$ and results in an LPD forward link signaling channel. The resulting composite output $S_{A+B+Sub}$ 410 of the encryptor and the approximately relative power levels are shown in FIG. 4. The final composite signal $S_{A+B+Sub}$ 410 is represented as $s_A(t)+s_B(t)+s_{Sub}(t)=A_I\cos(\omega_{c1}t)+A_Q\sin(\omega_{c1}t)+B_I\cos(\omega_{c2}t)+B_Q\sin(\omega_{c2}t)+C_{SubI}\cos(\omega_c t+\phi_c)+C_{SubQ}\sin(\omega_c t+\phi_c)$.

Figure 6:
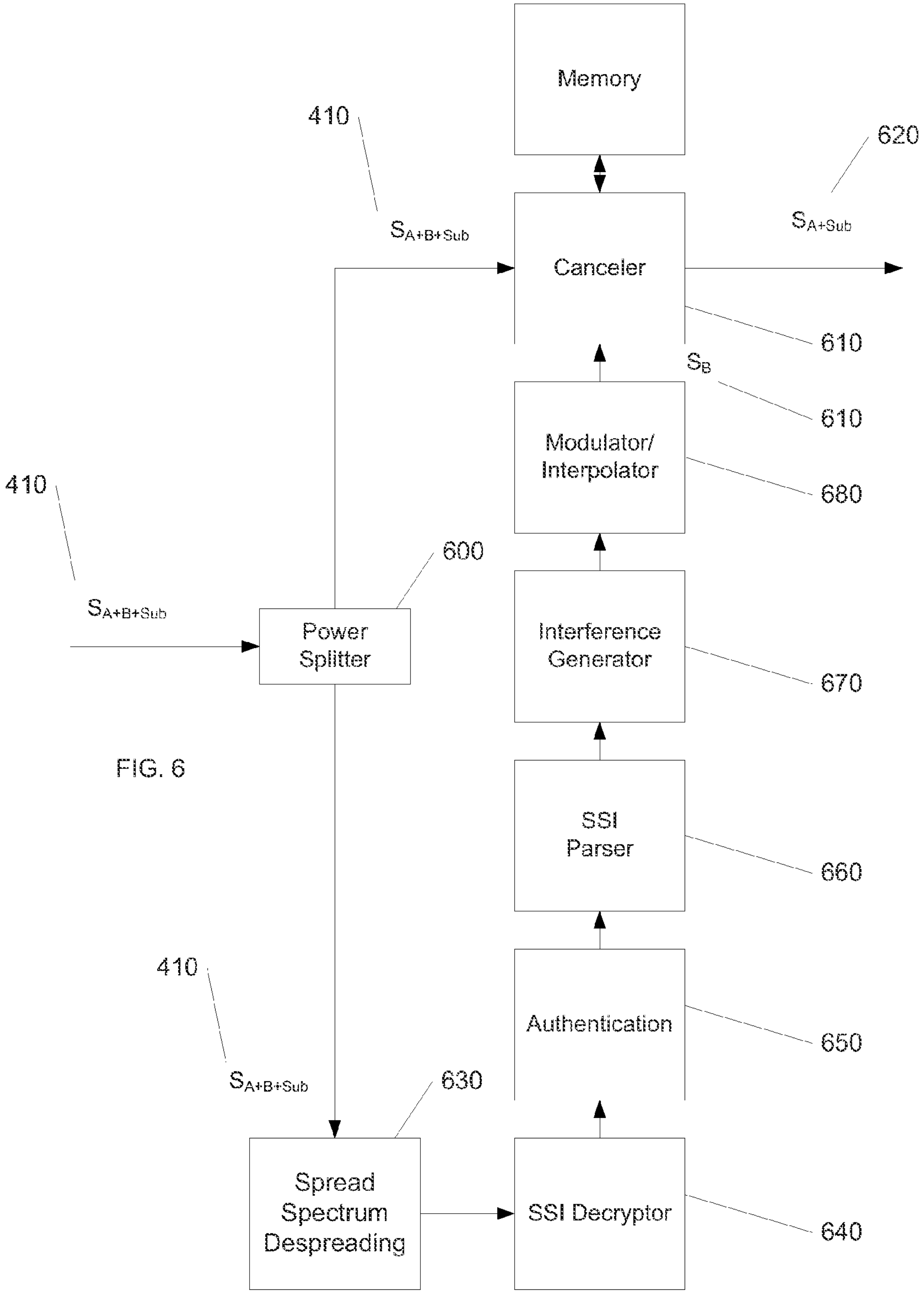
FIG. 6 shows an implementation of a decryption process where an original information carrier signal, an interference carrier signal and a sub-carrier synchronization signal are processed to return the original information carrier signal after decryption.

As shown in FIG. 6, after power splitting 600, both paths result in the following signal being present $s_A(t)+s_B(t)+s_{Sub}(t)=A_I\cos(\omega_{c1}t)+A_Q\sin(\omega w_{c1}t)+B_I\cos(\omega_{c2}t)+B_Q\sin(\omega_{c2}t)+$ $C_{SubI}$ $\cos(\omega_c t+\phi_c)+C_{SubQ}$ $\sin(\omega_c t+\phi_c)$. In this particular implementation, a stored copy of the interfering waveform $S_B$ is not required for Carrier-in-Carrier technology to cancel the interfering signal $S_B$ 310. Rather, a phase aligned copy of the interfering signal, $S_B$ 310, is locally generated and then fed to the cancellation devices 610 to cancel the $S_B$ 310 portion of the received composite $S_{A+B+Sub}$ signal 410. If properly synchronized, the resulting output of the canceller will be $S_{A+Sub}$ 620. The noise contribution of $S_{Sub}$ 400 is deemed insignificant and not required to be cancelled (or removed), leaving the desired output signal of $S_{A+Sub}$ 620.

From the power splitter 600, one path may be used for the $S_{Sub}$ signal that is despread 630 using the same a priori despreading sequence that is used on the encryptor and then demodulated using the same demodulating type as was used for modulating the $S_{Sub}$ sequence in the encryptor. In some implementations, BPSK may be used, but the modulation is not limited to BPSK. Once the $S_{Sub}$ carrier represented as $C_{SubI}\cos(\omega_c t+\phi_c)+C_{SubQ}\sin(\omega_c t+\phi_c)$ has been despread 630, demodulated, and decrypted 640, the authentication module 650 ensures the authenticity and integrity of the received message. Next the SSI parser 660 extracts the SSI message which may be used as part of the initial acquisition state of the decryptor to direct the synchronization of the interference generator 670. The resulting output then serves as the input to a modulator 680 to create $S_B$, represented as $s_B(t)=B_I\cos(\omega_{c2}t)+B_Q\sin(\omega_{c2}t)$ in the encryptor. It is noteworthy that the modulation type for $S_B$ 310 does not have to be the same modulation technique that is used for $S_A$ 300. The synchronized interfering signal is then fed to the cancellation device 610 to cancel the $S_B$ 310 portion of the received composite $S_{A+B+Sub}$ 410 signal. An external memory device may be used to provide waveform delay of either $S_{A+B+Sub}$ 410 or $S_B$ 310 for alignment purpose and proper cancellation. The input of locally generated $S_B$ 690 to the canceller 610 may be close in phase, but there still may exist some phase difference with $S_B$ 310 in the received composite $S_{A+B+Sub}$ signal 410. The canceller 610 may allow for a minute amount of timing difference ambiguity to further align the signals, and ultimately cancelling out component $S_B$ 310 of the received composite waveform $S_{A+B+Sub}$ 410. The resulting output of the canceller 610 will be $S_{A+Sub}$ 620. It is noteworthy to state, the degradation to $S_A$ (noise contribution of $S_{Sub}$) is deemed insignificant and not required to be cancelled, leaving the desired output signal of $S_A$ 300. However, if the desired $S_{Sub}$ carrier component 400 would be stored, a second canceller could be used to remove the $S_{Sub}$ component 400 from the $S_{A+Sub}$ signal 410 if desired to produce a final original signal of $S_A$ 300.

For cryptographic algorithms implemented in the encryption and decryption device requiring key management, manually entered Pre-Placed Keys (PPK) may be used. The SSI $S_{Sub}$ channel may be used for Over-The-Air-Rekeying (OTAR) or dynamic key updating. Additionally, any other method of key entry or exchange in the art may be used.

The following are particular implementations of methods and systems that may be configured for providing interference based physical-layer encryption and are provided as non-limiting examples:

Example 1

The output of a data device is connected to a modulator and is transmitting over a transmission medium to a receiving device. Using an implementation of the described method and system, an external encryption device is connected to the output of the modulator. The output of the modulated data stream is matched with nearly the same center frequency, occupied bandwidth, and power level creating nearly the same PSD to create an interfering signal with the original signal. The SSI Sub channel is then added to create an LPD signaling channel that is spread within 99% (3 dB) bandwidth of the occupied bandwidth. At the receive side, the decryption device is placed before the receiving device, and set to the proper center frequency and occupied bandwidth. The decryption device extracts the SSI sub channel and synchronizes the interference generator/Pseudo-random generator sequence to create a delayed match of the $S_B$ signal. The locally generated $S_B$ and received composite signal $S_{A+B+Sub}$ are routed to the canceller where $S_B$ is removed from the composite signal resulting in cancellation of the interfering signal. The output of the decryption device is a nearly exact replica of the desired signal.

Example 2

Using the system and method described in Example 1, the keying material may be symmetric or asymmetric independent of the key delivery mechanism.

Example 3

Using the system and method as described in Example 1, an encryption device may receive an original signal of $S_A$ as QPSK. The inline encryption device may use QPSK for setting the interfering signal $S_B$.

Example 4

Using the system and method as described in Example 1, an encryption device may receive an original signal of $S_A$ as 8PSK. The inline encryption device may use 8PSK for setting the interfering signal $S_B$.

Example 5

Using the system and method as described in Example 1, an encryption device may receive an original signal of $S_A$ as N-QAM, where N may be an integer number. The inline encryption device may use N-QAM for setting the interfering signal $S_B$.

Example 6

Using the system and method as described in Example 1, an encryption device may receive an original signal of $S_A$ as N-APSK, where N may be any integer number and use Amplitude Phase Shift Keying (APSK). The inline encryption device may use N-APSK for setting the interfering signal $S_B$.

Example 7

Using the system and method as described in Example 1, an encryption device may use a stream cipher or block cipher as a source of an interference generator for creating the interfering signal $S_B$. The SSI sub channel may be used to relay the current cryptographic state of the stream or block cipher to properly recreate $S_B$ within the decryptor.

Example 8

The output of a data device is connected to a modulator and is transmitting over a transmission medium to a receiving device. Using an implementation of the described method and system, the modulated data (original signal) stream may be interfered internally (interfering signal) within the modulator at the modulated symbol level to create the same center frequency, occupied bandwidth, and power level, which creates nearly the same PSD in the interfering signal as the original signal. The SSI Sub channel may be added at the symbol level to create an LPD signaling channel that is spread within 99% (3 dB) bandwidth of the occupied bandwidth. At the receiving demodulator, the SSI sub carrier is extracted and then the output is provided to the decryption section. The output of the SSI sub channel decryption device then is used to set the proper sequence for the $S_B$ to be generated and then provided to the cancellation device. Once the $S_B$ is synchronized the proper interference generator/pseudo-random generator sequence is output to the cancellation device where the interfering signal is then removed. The output of the cancellation device is a nearly exact replica of the desired signal. It is then provided to the demodulator for demodulation, decoding and output.

Example 9

Using the system and method as described in Example 8, the keying material may be symmetric or asymmetric independent of the key delivery mechanism.

Example 10

Using the system and method as described in Example 8, an encryption device may receive an original signal of $S_A$ as QPSK. The inline encryption device may use QPSK for setting the interfering signal $S_B$.

Example 11

Using the system and method as described in Example 8, an encryption device may receive an original signal of $S_A$ as 8PSK. The inline encryption device may use 8PSK for setting the interfering signal $S_B$.

Example 12

Using the system and method as described in Example 8, an encryption device may receive an original signal of $S_A$ as N-QAM, where N may be an integer number. The inline encryption device may use N-QAM for setting the interfering signal $S_B$.

Example 13

Using the system and method as described in Example 8, an encryption device may receive an original signal of $S_A$ as N-APSK, where N may be any integer number and use Amplitude Phase Shift Keying (APSK). The inline encryption device may use N-APSK for setting the interfering signal $S_B$.

Example 14

Using the system and method as described in Example 8, an encryption device may use a stream cipher or block cipher as a source of an interference generator creating the interfering signal $S_B$. The SSI sub channel may be used to relay the current cryptographic state of the stream or block cipherto properly recreate $S_B$ within the decryptor.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method for encrypting an information carrier signal comprising:

generating a sequence of data using a sequence generator;

modulating, using a first modulator an output from the sequence generator such that an interference signal results;

encoding synchronization information generated by the sequence generator using an encoder;

modulating, using a second modulator, the encoded synchronization information such that a synchronization carrier signal results;

spreading the synchronization carrier signal using a spreader such that a spread sub-carrier synchronization signal results; and combining a modulated information carrier signal, the interference signal, and the spread sub-carrier synchronization signal using a signal combiner such that a composite signal results, the interference signal having one or more signal characteristics that results in obfuscation of the information carrier signal when the information carrier signal and interference signal are combined.

2. The method of claim 1, further comprising authenticating the information carried in the spread sub-carrier synchronization signal using an authentication device.

3. The method of claim 1, further comprising encrypting information carried in the spread sub-carrier synchronization signal using an encryption device.

4. The method of claim 1, further comprising providing forward error correction (FEC) to the spread sub-carrier synchronization signal using the encoder.

5. The method of claim 1, wherein the sub-carrier synchronization signal is modulated using one or more modulating devices.

6. The method of claim 1, wherein the spreading further comprises using spread spectrum techniques to reduce a power spectral density of the spread sub-carrier synchronization signal such that the power spectral density of the spread sub-carrier synchronization signal is lower than a power spectral density of the combined information carrier signal and interference signal.

7. The method of claim 1, further comprising determining a center frequency and occupied bandwidth of the information carrier signal using one or more Fourier transform techniques.

8. The method of claim 1, further comprising determining the power level of the information carrier signal using a power detector.

9. The method of claim 1, further comprising manually configuring one or more characteristics of the information carrier signal to specify a center frequency, occupied bandwidth, or power level of the information carrier signal.

10. The method of claim 1, further comprising up-converting the interference and sub-carrier synchronization signals prior to combining these signals with the information carrier signal.

11. The method of claim 1, wherein the combining of the signals occurs at baseband frequency.

12. A method of recovering encrypted information comprising:

receiving a composite carrier signal using a receiving device, the composite carrier signal comprising a previously combined information carrier signal, interference signal, and spread sub-carrier synchronization signal, wherein the interference signal has one or more signal characteristics that results in obfuscation of the information carrier signal by the interference signal in the composite signal;

despreading the spread sub-carrier synchronization signal using a despreader;

demodulating the despread sub-carrier synchronization signal using a demodulator;

decoding the demodulated despread sub-carrier synchronization signal using a decoder, resulting in extracted synchronization information from the sub-carrier synchronization signal;

synchronizing an interference generator using the extracted synchronization information such that the interference generator creates a replica of the interference signal contained in the received composite signal; and cancelling the interference signal from the composite signal using a cancelling device that uses one or more cancellation techniques to obtain the information carrier signal.

13. The method of claim 12, further comprising splitting the composite carrier signal using a signal splitter.

14. The method of claim 12, wherein the despreading further comprises spread spectrum despreading.

15. The method of claim 12, further comprising decrypting information carried in the sub-carrier synchronization signal using a decryption device.

16. The method of claim 12, further comprising authenticating information carried in the sub-carrier synchronization signal using an authentication device.

17. The method of claim 12, further comprising applying a frame parser to information carried in the sub-carrier synchronization signal.

18. The method of claim 12, further comprising generating a synchronized interference sequence using an interference sequence generator.

19. The method of claim 12, further comprising modulating the interference sequence using a modulator to generate a replica of the interference signal.

20. The method of claim 12, further comprising providing phase alignment between the replicated interference signal and the interference signal in the composite carrier signal using a memory device.

21. The method of claim 12, further comprising configuring a center frequency, occupied bandwidth, or power level of the interference carrier signal, information carrier signal, or composite carrier signal.

22. A system for encrypting an information carrier comprising:

a sequence generator configured to generate a sequence of data;

a first modulator configured to modulate an output from the sequence generator such that an interference signal results;

an encoder configured to encode synchronization information generated by the sequence generator;

a second modulator configured to modulate the encoded synchronization information such that a synchronization carrier signal results;

a spreader configured to spread the synchronization carrier signal such that a spread sub-carrier synchronization signal results; and a combiner configured to combine a modulated information carrier signal, the interference signal, and the spread sub-carrier synchronization signal using a signal combiner such that a composite signal results, the interference signal having one or more signal characteristics that results in obfuscation of the information carrier signal when the information carrier signal and interference signal are combined.

23. The system of claim 22, further comprising an authentication device configured to authenticate the information carried in the spread sub-carrier synchronization signal.

24. The system of claim 22, further comprising an encryption device configured to encrypt information carried in the spread sub-carrier synchronization signal.

25. The system of claim 22, wherein the encoder is further configured to provide forward error correction (FEC) to the spread sub-carrier synchronization signal.

26. The system of claim 22, further comprising one or more modulating devices configured to modulate the sub-carrier synchronization signal.

27. The system of claim 23, wherein the spreader is further configured to use spread spectrum techniques to reduce a power spectral density of the spread sub-carrier synchronization signal such that the power spectral density of the spread sub-carrier synchronization signal is lower than a power spectral density of the combined information carrier signal and interference signal.

28. The system of claim 22, further comprising a processor configured to determine a center frequency and occupied bandwidth of the information carrier signal using one or more Fourier transform techniques.

29. The system of claim 22, further comprising a power detector configured to determine the power level of the information carrier signal.

30. The system of claim 22, further configured for manual configuration of one or more characteristics of the information carrier signal to specify a center frequency, occupied bandwidth, or power level of the information carrier signal.

31. The system of claim 22, further comprising an upconversion device configured to up-convert the interference and sub-carrier synchronization signals prior to combining these signals with the information carrier signal.

32. The system of claim 22, wherein the combiner is further configured to combine the signals at baseband frequency.

33. A system of recovering encrypted information comprising:

a receiving device configured to receive a composite carrier signal, the composite carrier signal comprising a previously combined information carrier signal, interference signal, and spread sub-carrier synchronization signal, wherein the interference signal has one or more signal characteristics that results in obfuscation of the information carrier signal by the interference signal in the composite signal;

a despreader configured to despread the spread sub-carrier synchronization signal;

a demodulator configured to demodulate the despread sub-carrier synchronization signal;

a decoder configured to decode the demodulated despread sub-carrier synchronization signal, resulting in extracted synchronization information from the sub-carrier synchronization signal;

an interference generator configured to be synchronized using the extracted synchronization information and create a replica of the interference signal contained in the received composite signal; and a canceling device configured to cancel the interference signal from the composite signal using one or more cancellation techniques to obtain the information carrier signal.

34. The system of claim 33, further comprising a splitter configured to split the composite carrier signal.

35. The system of claim 33, wherein the despreader is further configured to use spread spectrum despreading.

36. The system of claim 33, further comprising a decryption device configured to decrypt information carried in the sub-carrier synchronization signal.

37. The system of claim 33, further comprising an authentication device configured to authenticate information carried in the sub-carrier synchronization signal.

38. The system of claim 33, further comprising a frame parser configured to frame parse information carried in the sub-carrier synchronization signal.

39. The system of claim 33, further comprising an interference sequence generator configured to generate a synchronized interference sequence.

40. The system of claim 33, further comprising a modulator configured to modulate the interference sequence to generate a replica of the interference signal.

41. The system of claim 33, further comprising a memory device configured to provide phase alignment between the replicated interference signal and the interference signal in the composite carrier.

42. The system of claim 33, further comprising a configuration device that allows configuration of a center frequency, occupied bandwidth, or power level of the interference carrier signal, information carrier signal, or composite carrier signal.

* * * * *